US011811607B2

(12) United States Patent
Katukam et al.

(10) Patent No.: US 11,811,607 B2
(45) Date of Patent: *Nov. 7, 2023

(54) METHODS AND SYSTEMS FOR NETWORK DEVICE NAME MANAGEMENT

(71) Applicant: Nile Global, Inc., San Jose, CA (US)

(72) Inventors: Suresh Katukam, Milpitas, CA (US); Promode Nedungadi, San Jose, CA (US); Arun Madupu, Bangalore (IN); Vijay Bollapragada, Bangalore (IN)

(73) Assignee: Nile Global, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,583

(22) Filed: Nov. 18, 2022

(65) Prior Publication Data

US 2023/0078686 A1 Mar. 16, 2023

Related U.S. Application Data

(63) Continuation of application No. 17/134,037, filed on Dec. 24, 2020, now Pat. No. 11,509,533.

(51) Int. Cl.
*H04L 41/08* (2022.01)
*H04L 67/1097* (2022.01)
*H04L 61/3015* (2022.01)
*H04W 48/16* (2009.01)
*H04L 61/4511* (2022.01)
*H04L 101/375* (2022.01)
*H04L 101/622* (2022.01)

(52) U.S. Cl.
CPC ...... *H04L 41/0886* (2013.01); *H04L 61/3015* (2013.01); *H04L 61/4511* (2022.05); *H04L 67/1097* (2013.01); *H04W 48/16* (2013.01); *H04L 2101/375* (2022.05); *H04L 2101/622* (2022.05)

(58) Field of Classification Search
None
See application file for complete search history.

(56) References Cited

U.S. PATENT DOCUMENTS

| 8,887,262 | B1 | 11/2014 | Turner et al. |
| 9,173,115 | B2 | 10/2015 | Sundareswaran et al. |
| 9,769,734 | B2 | 9/2017 | Goto |
| 2012/0195231 | A1 | 8/2012 | Fonseca et al. |
| 2012/0226791 | A1 | 9/2012 | Ramaswamy et al. |
| 2012/0265865 | A1* | 10/2012 | Tanaka ............ H04L 41/0893 709/223 |
| 2013/0275508 | A1 | 10/2013 | Bestmann et al. |
| 2014/0222989 | A1 | 8/2014 | Tanaka et al. |
| 2014/0278281 | A1 | 9/2014 | Vaynriber et al. |
| 2015/0172118 | A1 | 6/2015 | Lin |
| 2016/0036764 | A1 | 2/2016 | Dong et al. |

(Continued)

Primary Examiner — Viet D Vu
(74) Attorney, Agent, or Firm — LOZA & LOZA, LLP

(57) ABSTRACT

Embodiments of a device and method are disclosed. In an embodiment, a method of network device name management involves at a cloud server, determining a device name of a network device to be deployed at a customer site based on site survey result information of the customer site, at the cloud server, receiving network device information of the network device after the network device is deployed at the customer site, and at the cloud server, associating the device name of the network device with the network device information of the network device.

20 Claims, 9 Drawing Sheets

(56) References Cited

U.S. PATENT DOCUMENTS

| | | |
|---|---|---|
| 2017/0156076 A1 | 6/2017 | Eom et al. |
| 2017/0374560 A1 | 12/2017 | Judge et al. |
| 2018/0101666 A1 | 4/2018 | Nakatani et al. |
| 2018/0120973 A1 | 5/2018 | Nakamura |
| 2019/0020540 A1 | 1/2019 | Yen et al. |
| 2019/0050407 A1 | 2/2019 | Kerkes et al. |
| 2020/0084178 A1 | 3/2020 | Dreyer |

* cited by examiner

METHODS AND SYSTEMS FOR NETWORK DEVICE NAME MANAGEMENT

CROSS REFERENCE TO RELATED APPLICATIONS

This application is a continuation of U.S. application Ser. No. 17/134,037, now U.S. Pat. No. 11,509,533, filed on Dec. 24, 2020, the contents of which are incorporated by reference herein.

BACKGROUND

A network, for example, an enterprise network, usually assigns recognizable names to various network elements to identify the network elements for operations and trouble shooting. Typically, names are created for network elements in a network manually by a network administrator of the network, which can be inefficient and error-prone. In addition, device names of network devices are typically manually associated with other characteristics of the network devices by a network administrator, which can also be inefficient and error-prone. Therefore, there is a need for network device name management technology that can automatically assign device names to network devices and associate device names of network devices with other characteristics of the network devices without manual intervention.

SUMMARY

Embodiments of a device and method are disclosed. In an embodiment, a method of network device name management involves at a cloud server, determining a device name of a network device to be deployed at a customer site based on site survey result information of the customer site, at the cloud server, receiving network device information of the network device after the network device is deployed at the customer site, and at the cloud server, associating the device name of the network device with the network device information of the network device. Other embodiments are also described.

In an embodiment, at the cloud server, determining the device name of the network device to be deployed at the customer site based on the site survey result information of the customer site includes at the cloud server, determining the device name of the network device to be deployed at the customer site based on a device naming rule set that utilizes a customer symbol of the customer site and a device type of the network device.

In an embodiment, the device name of the network device includes the customer symbol of the customer site, information related to the device type of the network device, and a respective number of the network device.

In an embodiment, the method further includes at the cloud server, storing the device name of the network device in a deployment database.

In an embodiment, the method further includes at the cloud server, assigning an installation job for deploying the network device at the customer site to an installer, and at the cloud server, receiving the network device information of the network device after the network device is deployed at the customer site includes at the cloud server, receiving the network device information of the network device from the installer after the network device is deployed at the customer site.

In an embodiment, the network device information of the network device includes a device serial number and a media access control (MAC) address of the network device.

In an embodiment, the method further includes at the cloud server, associating the device name of the network device with a Domain Name System (DNS) entry of the network device.

In an embodiment, the site survey result information includes at least one of locations and a number of wired ports to be installed at the customer site on a per floor basis, available power outlet and rack space information at the customer site on a per floor basis, locations and a number of wireless access points (APs) to be installed at the customer site on a per floor basis, and channel interference information between wireless APs.

In an embodiment, a system for automatic network design includes a device deployment module is configured to determine a device name of a network device to be deployed at a customer site based on site survey result information of the customer site, receive network device information of the network device after the network device is deployed at the customer site, and associate the device name of the network device with the network device information of the network device, and a deployment database connected to the device deployment module and configured to store the device name of the network device and the network device information.

In an embodiment, the device deployment module is further configured to determine the device name of the network device to be deployed at the customer site based on a device naming rule set that utilizes a customer symbol of the customer site and a device type of the network device.

In an embodiment, the device name of the network device includes the customer symbol of the customer site, information related to the device type of the network device, and a respective number of the network device.

In an embodiment, the device deployment module is further configured to assign an installation job for deploying the network device at the customer site to an installer.

In an embodiment, the device deployment module is further configured to receive the network device information of the network device and location information of the network device from the installer after the network device is deployed at the customer site.

In an embodiment, the network device information of the network device includes a device serial number and a media access control (MAC) address of the network device.

In an embodiment, the device deployment module is further configured to associate the device name of the network device with a Domain Name System (DNS) entry of the network device.

In an embodiment, the site survey result information includes at least one of locations and a number of wired ports to be installed at the customer site on a per floor basis, available power outlet and rack space information at the customer site on a per floor basis, locations and a number of wireless access points (APs) to be installed at the customer site on a per floor basis, and channel interference information between wireless APs.

In an embodiment, a method for network device name management involves at a cloud server, determining a device name of a network device to be deployed at a customer site based on site survey result information of the customer site, at the cloud server, storing the device name of the network device in a deployment database, at the cloud server, assigning an installation job for deploying the network device at the customer site to an installer, at the cloud server, receiving network device information and location information of the network device from the installer after the network device is deployed at the customer site, and at the cloud server, associating the device name of the network device with the network device information and the location information of the network device in the deployment database.

In an embodiment, at the cloud server, determining the device name of the network device to be deployed at the customer site based on the site survey result information of the customer site includes at the cloud server, determining the device name for the network device to be deployed at the customer site based on a device naming rule set that utilizes a customer symbol of the customer site and a device type of the network device.

In an embodiment, the device name of the network device includes the customer symbol of the customer site, information related to the device type of the network device, and a respective number of the network device.

In an embodiment, the network device information of the network device includes a device serial number and a media access control (MAC) address of the network device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
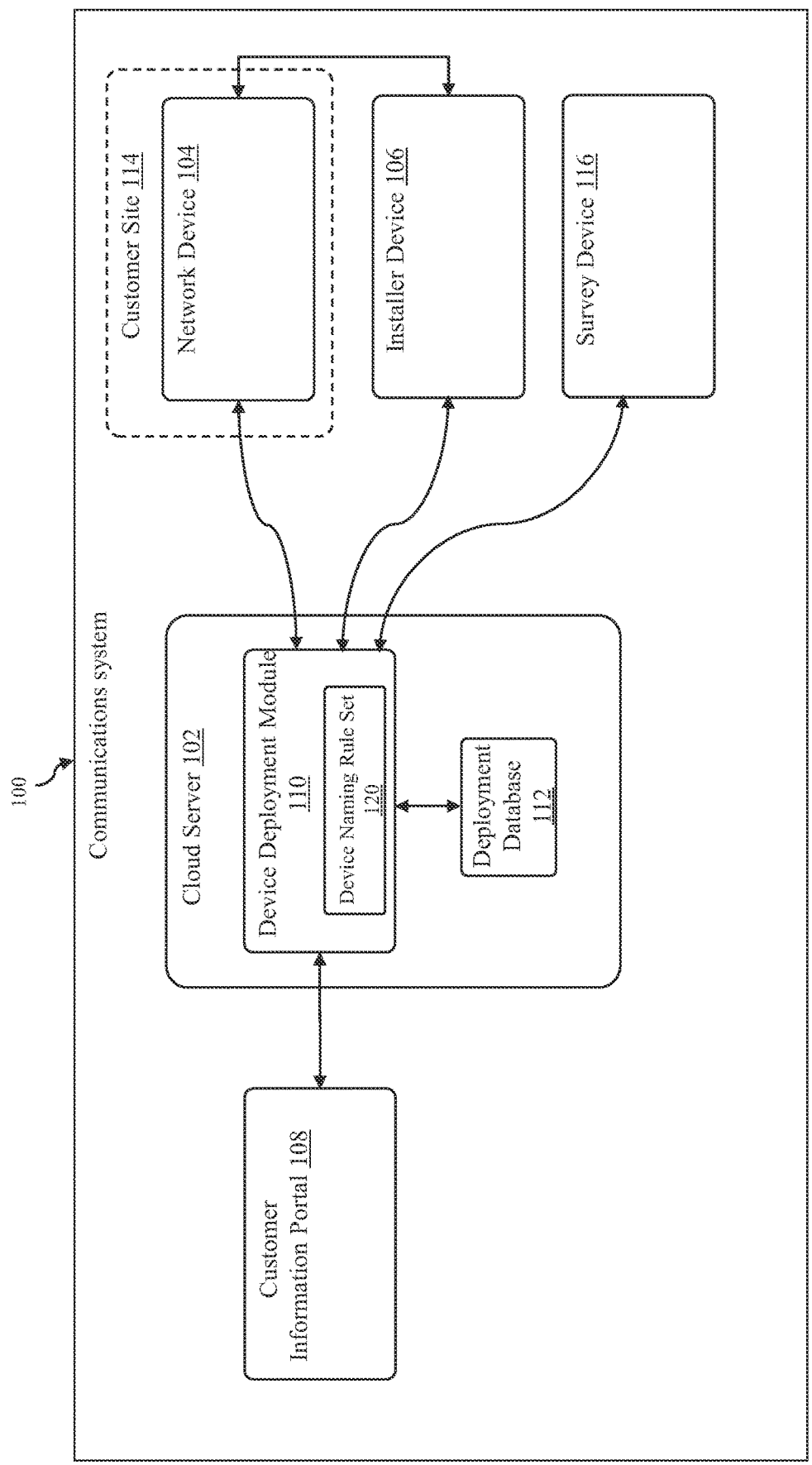
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, a network device 104 within a customer site 114, an installer device 106, a survey device 116, and an optional customer information portal 108. The cloud server, the network device, the installer device, the survey device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one network device, more than one customer site, more than one installer device, more than one survey device, and/or more than one customer information portal. In another example, although the cloud server, the network device, the customer site, the installer device, the survey device, and the customer information portal are shown in FIG. 1 as being connected in certain topology, the network topology of the communications system 100 is not limited to the topology shown in FIG. 1.

The cloud server 102 can be used to provide at least one service to the customer site (e.g., to the network device 104 located at the customer site 114). In some embodiments, the cloud server is configured to provide a naming service to network devices (e.g., the network device 104) at the customer site. For example, the cloud server is configured to automatically assign names to network devices (e.g., the network device 104) at the customer site and/or to associate the names of network devices at the customer site with corresponding network configuration (e.g., device serial numbers and/or media access control (MAC) addresses) of the network devices. The cloud server may be configured to perform automatic network design for a network to be deployed or installed at the customer site, and/or to provide an activation service (e.g., a location based activation service) to network devices (e.g., the network device 104) at the customer. The cloud server may be implemented in hardware (e.g., circuits), software, firmware, or a combination thereof. In some embodiments, the cloud server is constructed on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations and other data.

In the embodiment depicted in FIG. 1, the cloud server includes a device deployment module 110 and a deployment database 112 configured to store deployment data. In some embodiments, the device deployment module 110 is configured to provide a naming service using a device naming rule set 120 for network devices (e.g., the network device 104) at the customer site. The device naming rule set 120 may include one or more device naming rules for determining device names for network devices. For example, the device deployment module is configured to automatically assign names to network devices (e.g., the network device 104) at the customer site and/or to associate the names of network devices at the customer site with the corresponding network configuration (e.g., Domain Name System (DNS) entries in an enterprise DNS, device serial numbers and/or media access control (MAC) addresses) of the network devices. The device deployment module may be configured to perform a network device deployment service (e.g., a location based network device deployment service) for network devices (e.g., the network device 104) and/or to perform automatic network design for a network at the customer site 114. In some embodiments, the deployment database 112 is configured to store deployment data for a network to be deployed at the customer site. For example, the deployment database 112 is configured to store names of network devices (e.g., the network device 104) at the customer site and the corresponding network configuration (e.g., device serial numbers and/or media access control (MAC) addresses) of the network devices. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site.

The customer site 114 may include one or more buildings, and each building may include one or more floors. A network that can be deployed at the customer site may include any type of suitable network device or devices, (e.g., the network device 104). For example, the network device may be designated to be deployed to a specific building, a specific floor within a building, and/or a specific location on a floor of a building. The network device may be fully or partially implemented as an Integrated Circuit (IC) device. In some embodiments, the network device is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, the network device may be compatible with Institute of Electrical and Electronics Engineers (IEEE) 802.3 protocol and/or one or more wireless local area network (WLAN) communications protocols, such as IEEE 802.11 protocol. In some embodiments, the network device is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as IEEE 802.11 protocol. In some embodiments, the network device is a wireless station (STA) that wirelessly connects to a wireless AP. For example, the network device may be a laptop, a desktop personal computer (PC), a mobile phone, or other wireless device that supports at least one WLAN communications protocol (e.g., IEEE 802.11)). In some embodiments, the network device is a wired communications device that is compatible with at least one wired local area network (LAN) communications protocol, such as a wired router (e.g., an Ethernet router), a wired switch, a wired hub, or a wired bridge device (e.g., an Ethernet bridge).

The installer device 106 may be any type of suitable network device that is used by an installer or technician to facilitate the deployment of the network device 104. The installer device may be fully or partially implemented as an IC device. In some embodiments, the installer device is a wired communications device that includes at least one processor (e.g., a microcontroller, a DSP, and/or a CPU), at least one wired communications transceiver, and at least one wired communications interface and that supports at least one wired communications protocol. In some embodiments, the installer device is a wireless communications device that includes at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a Personal Digital Assistant (PDA) etc. that supports one or more radio frequency (RF) communications protocols, including without limitation, The Global System for Mobile Communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as IEEE 802.11 protocol.

The survey device 116 may be any type of suitable network device that is used by a technician to facilitate network design for the customer site 114. The survey device may be fully or partially implemented as an IC device. In some embodiments, the survey device is a computing device that includes at least one processor (e.g., a microcontroller, a DSP, and/or a CPU), at least one communications transceiver, and at least one communications interface and that supports at least one communications protocol. For example, the survey device is a wireless communications device that includes at least one wireless communications transceiver, at least one wireless communications interface, and/or at least one antenna and that supports at least one wireless communications protocol. In some embodiments, the survey device is a handheld wireless device, such as a cellular phone or a mobile phone (e.g., a smart phone), a pad computer, a Personal Digital Assistant (PDA) etc. that supports one or more radio frequency (RF) communications protocol, including without limitation, GSM, UMTS, CDMA, WiMax and communications protocols as defined by 3GPP or 3GPP2, 4G LTE, 5G, and IEEE 802.16 standards bodies and/or one or more WLAN communications protocols, such as IEEE 802.11 protocol. In some embodiments, site survey software (e.g., a commonly used Wi-Fi design and spectrum analysis software or App) is installed on the survey device (e.g., a mobile phone or tablet). In some embodiments, the survey device may include a special-purpose device (e.g., a spectrum analyzer device) configured to measure the wireless signal strength at the customer site.

The customer information portal 108, which may be optional to the communications system 100, is configured to receive customer information. In some embodiments, the customer information portal includes a user interface that allows a customer to input information associated with network design for the customer site 114, such as one or more specific requirements or restrictions. For example, the user interface (e.g., a graphical user interface (GUI)) may allow a customer to input information associated with network design for the customer site. The customer information portal may be implemented in hardware (e.g., circuits), software, firmware, or a combination thereof.

Figure 2:
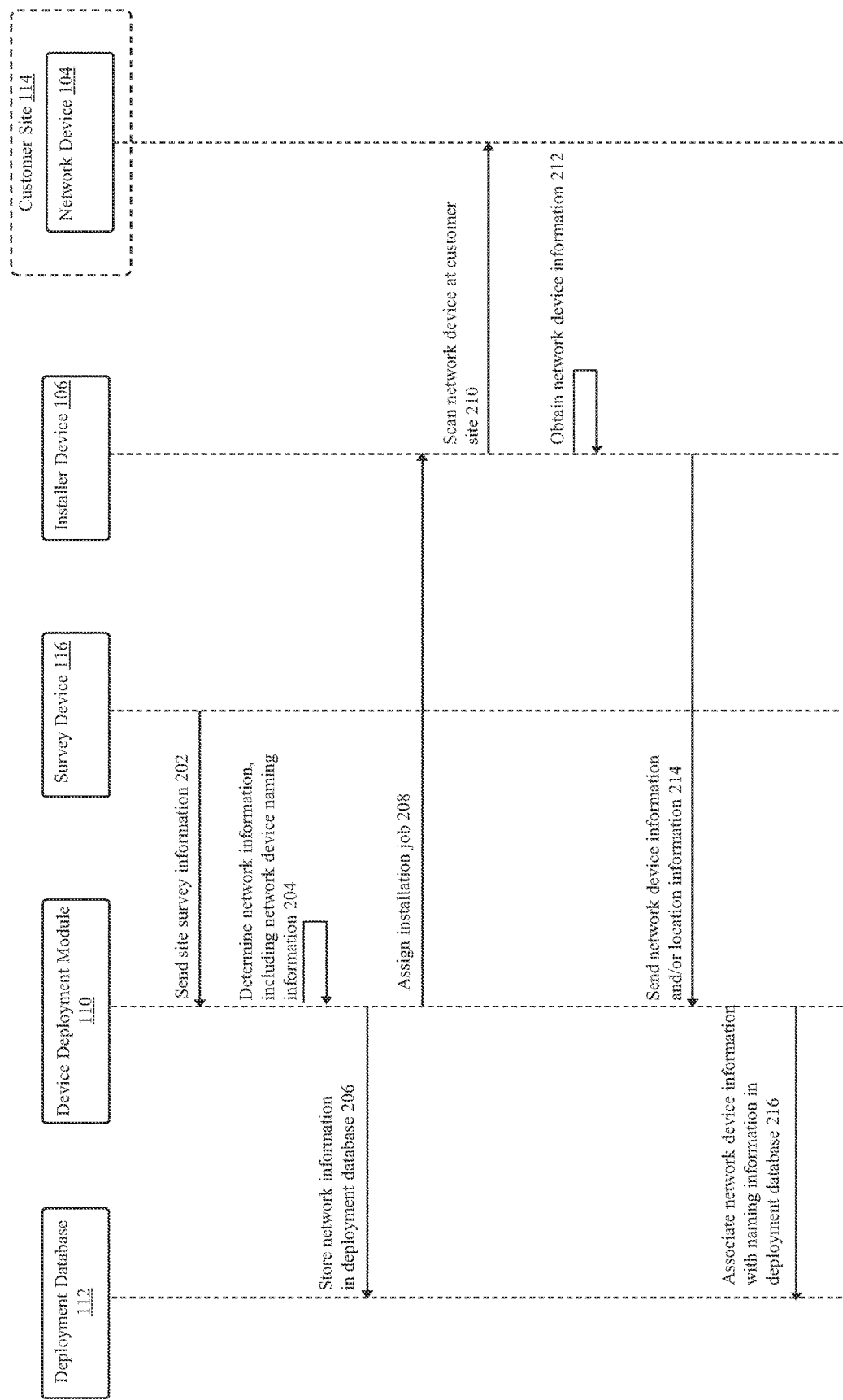
FIG. 2 shows a swim-lane diagram illustrating an example procedure for network device name management in the communications system depicted in FIG. 1.

FIG. 2 shows a swim-lane diagram illustrating an example procedure for network device name management in the communications system 100 depicted in FIG. 1. In this automatic network device naming procedure, a device name for the network device 104 at the customer site 114 is automatically generated based on application of the device naming rule set, which includes one or more device naming rules for determining device names for network devices, by the device deployment module 110 of the cloud server 102 and stored in the deployment database 112 and is associated with the corresponding network configuration (e.g., a device serial number and/or a MAC address) of the network device in the deployment database 112.

In operation 202, the survey device 116 transmits survey result information of the customer site 114 to the device deployment module 110 of the cloud server 102. The site survey result information may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In some embodiments, the survey result information of the customer site 114 includes the location and the number of wired port(s) needed for the customer site on a per floor basis, whether or not there is enough power outlet(s) and rack space(s) available to deploy network device(s), an optimal number of wireless AP(s) to be installed and location(s) on a per floor basis to meet the coverage and capacity requirements of the customer site, and/or any co-channel interference between wireless APs. In some embodiments, the survey device transmits the survey result information of the customer site 114 from a mobile app installed in the survey device to the device deployment module 110. In some embodiments, a technician uses the survey device 116 to perform a site survey at the customer site 114 to obtain the site survey result information. In some embodiments, the technician uses information in a mobile app installed in the survey device to perform a site survey at the customer site. For example, the survey device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In some embodiments, a technician uses the survey device 116 to perform a site survey at the customer site based on customer wired and/or wireless requirements. In some embodiments, the survey device 116 is configured to identify the location and the number of wired port(s) to be installed at the customer site on a per floor basis, to identify if there is enough power outlet(s) and rack space(s) available to deploy network device(s), to identify an optimal number of wireless AP(s) to be installed at the customer site and location(s) on a per floor basis to meet the coverage and capacity requirements of the customer site, and/or to identify any co-channel interference between wireless APs.

In operation 204, the device deployment module 110 of the cloud server 102 determines network information (e.g., a network design, which includes naming information) for a network to be deployed at the customer site 114 based on the survey result information received from the survey device 116. In some embodiments, the device deployment module is configured to determine a network design for a network to be deployed at the customer site 114 based on the survey result information received from the survey device 116, which includes naming information of the network to be deployed. For example, the device deployment module automatically determines a network design for a network to be deployed at the customer site 114 and automatically determines a device name for a network device of the network to be deployed at the customer site 114 according to a device naming rule set that utilizes a format such ascustomer_ticker_symbol.device_type.number, where customer_ticker_symbol represents a ticker symbol of a customer at the customer site 114, device_type represents a device type of the network device, and number represents a respective number of the network device. For example, a distribution switch (DS) to be deployed to a customer site (e.g., the customer site 114) with a customer name of "Acme Corporation Inc." and a customer ticker symbol of "ACME" can be automatically named as ACME.DS.1. However, other naming conventions can also be used and implemented by the device naming rule set. Compared to manually determining device names for network devices at a network to be deployed at a customer site, the device deployment module can automatically determine device names for network devices at a network to be deployed at a customer site (e.g., the customer site 114) based on or according to a pre-established device naming rule set, which includes one or more device naming rules. Consequently, device naming efficiency can be improved and device naming errors (e.g., duplicate names) can be reduced. For example, the pre-established device naming rule set may include a name conflict checker to ensure that there are no naming conflicts. In some embodiments, the network design may also include a Bill of Materials (BoM) and a connectivity map for the network to be deployed at the customer site. In some embodiments, the device deployment module is configured to automatically generate a list of network elements to be newly installed at the customer site 114 and automatically assign names to the network elements to be newly installed at the customer site. Compared to manually determining BoM data (e.g., required network elements) for a network to be deployed at a customer site, the device deployment module 110 of the cloud server 102 can automatically determine a BoM for a network at a customer site (e.g., the customer site 114). Consequently, network design efficiency and accuracy can be improved. In addition, compared to designing network topology for a network at a customer site after the network is installed at the customer site, the device deployment module 110 can automatically generate a topology map for a network at a customer site prior to deploying the network at the customer site. Consequently, time required for network design for a customer site can be shortened or reduced. The list of network elements to be newly installed at the customer site 114 may be generated using a standardized network block that includes a specific combination of network devices. In an embodiment, a customer network may be designed as a set of standardized network blocks, which are also referred to as network service blocks (NSBs). In some embodiments, once the BoM for a network to be deployed at the customer site is generated, the device deployment module is configured to automatically generate a connectivity map that defines how network elements in the BoM are connected to each other. In some embodiments, the automatic generation of a connectivity map is enabled by building rules using a reference topology that defines how network elements connect to each other and network ports to be used by the network elements (i.e., allowed ports) for the connectivity. For example, a specific device (e.g., a network switch) may include a first set of ports (e.g., 1-24) that are of a first type (e.g., 10/25GE Small Form-Factor Pluggable (SFP) 28, 10/25GE SFP28 or 100G Quad Small Form-Factor Pluggable (QSFP) 28) and are used to connect the specific device with a first sets of network devices (e.g., APs and wired routers) and a second set of ports (e.g., 25-28) that are of a second type (e.g., 10/25GE Small Form-Factor Pluggable (SFP) 28, 10/25GE SFP28 or 100G Quad Small Form-Factor Pluggable (QSFP) 28) and are used to connect the specific device with a second sets of network devices (e.g., access switches). However, the number and types of ports that a network device can have are not limited to the examples described.

TABLE 1

| Device Type | Device Name | General Location | Serial # | Mac Address | X, Y Location | GPS Coordinates |
|---|---|---|---|---|---|---|
| DS | ACME.DS.1 | Floor 1 | Blank | Blank | Blank | Blank |
| DS | ACME.DS.2 | Floor 1 | Blank | Blank | Blank | Blank |
| HE | ACME.HE.1 | Floor 1 | Blank | Blank | Blank | Blank |
| HE | ACME.HE.2 | Floor 1 | Blank | Blank | Blank | Blank |
| AS | ACME.AS.1 | Floor 1 | Blank | Blank | Blank | Blank |
| AS | ACME.AS.2 | Floor 1 | Blank | Blank | Blank | Blank |
| AP | ACME.AP.1 | Floor 1 | Blank | Blank | Blank | Blank |
| AP | ACME.AP.2 | Floor 1 | Blank | Blank | Blank | Blank |
| Sensor | ACME.SE.1 | Floor 1 | Blank | Blank | Blank | Blank |
| Sensor | ACME.SE.2 | Floor 1 | Blank | Blank | Blank | Blank |

Example network design for a network to be deployed at a customer site (e.g., the customer site 114) with a customer name of "Acme Corporation Inc." and a customer ticker symbol of "ACME," which includes automatically assigned names of network devices of the network to be deployed at a customer site (e.g., the customer site 114), device type information (e.g., distribution switch (DS), head end (HE), access switch (AS), access point (AP), or sensor (SE)), general location information (e.g., first floor at the customer site)) are listed in Table 1. After the network devices are deployed at the customer site, blank information in Table 1 may be filled with corresponding network device information (serial numbers and MAC addresses) and location information (e.g., X, Y locations and/or Global Positioning System (GPS) coordinates (or other global or satellite location system coordinates) of the network device.

After the device deployment module 110 of the cloud server 102 determines network information (e.g., a network design and naming information) for a network to be deployed at the customer site 114, in operation 206, the device deployment module stores the network information for the network to be deployed at the customer site 114 in the deployment database 112, which is also referred to as a planned deployment (PD) database.

Figure 3:
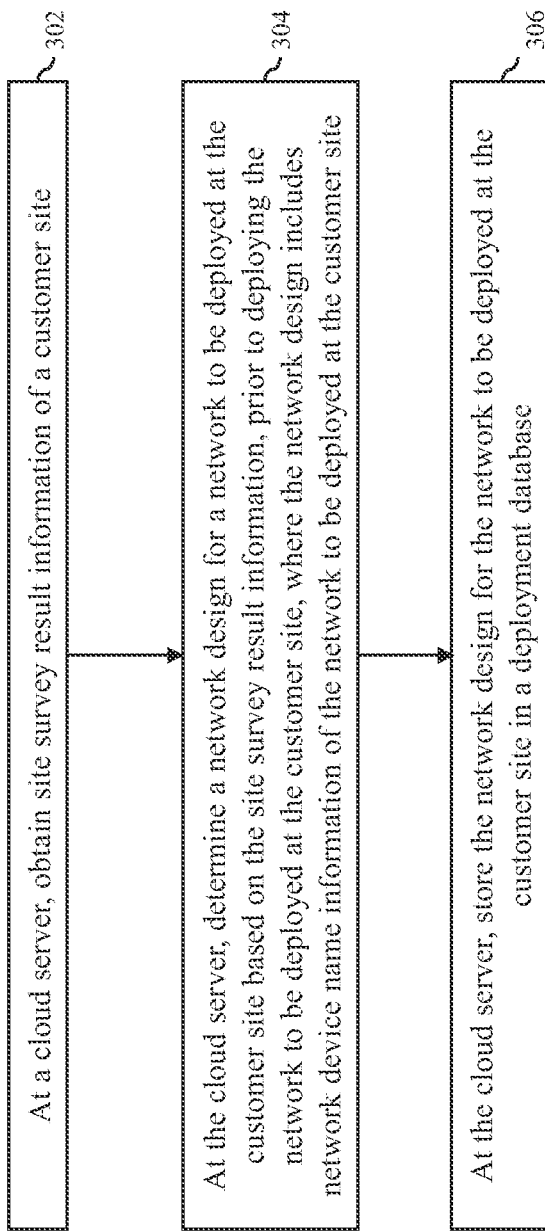
FIG. 3 is a process flow diagram of a method for automatic device name generation in accordance to an embodiment of the invention.

FIG. 3 is a process flow diagram of a method for automatic device name generation in accordance to an embodiment of the invention. According to the method, at block 302, at a cloud server, site survey result information of a customer site is obtained. At block 304, at the cloud server, a network design for a network to be deployed at the customer site is determined based on the site survey result information, prior to deploying the network to be deployed at the customer site, where the network design includes network device name information of the network to be deployed at the customer site. At block 306, at the cloud server, the network design for the network to be deployed at the customer site is stored in a deployment database. The operations 302, 304, 306 in the flow diagram of FIG. 3 may correspond to the operations 202, 204, 206 in the swim-lane diagram of FIG. 2. The cloud server may be similar to, the same as, or a component of the cloud server 102 depicted in FIG. 1. The deployment database may be similar to, the same as, or a component of the deployment database 112 depicted in FIG. 1. The customer site may be similar to, the same as, or a component of the customer site 114 depicted in FIG. 1.

Turning back to the swim-lane diagram shown in FIG. 2, after the device deployment module 110 of the cloud server 102 determines network information (e.g., a network design and naming information) for a network to be deployed at the customer site 114, the network is deployed (e.g., network devices including switches, routers, hubs, and/or wireless APs are installed) at the customer site 114 based on the network design (e.g., the BoM and the connectivity map). In operation 208, the device deployment module 110 assigns an installation job to an installer or technician that uses the installer device 106. In some embodiments, the installer/technician uses a mobile application (app) that is installed in the installer device and is assigned the installation job via the mobile app. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In an embodiment, an installation job that is assigned to the installer or technician includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and where a network device is to be installed in a floor plan, and/or a deployment topology that defines how network devices are connected to each other. One or more network devices to be installed are sent to a customer site. In some embodiments, there is no pre-population of device specific information (e.g., device serial number and/or media access control (MAC) address) of a network device to be installed in a central database when the network device to be installed is sent to a customer site. For example, the device deployment module 110 has no knowledge of specific information (e.g., device serial number and/or media access control (MAC) address) of a network device to be installed at a customer site before the network device is installed at the customer site.

In operation 210, the installer or technician uses the installer device 106 to scan the network device 104 at the customer site 114. In some embodiments, the installer or technician uses information in a mobile app installed in the installer device and scans the network device 104 at a customer location indicated by the mobile app. The installer or technician may use the installer device (e.g., a mobile app installed in the installer device) to scan a code (e.g., a QR code) of the network device 104. The code of the network device 104 may be on a surface of the network device 104 and/or on the packaging (e.g., the box or the wrapper) of the network device 104. For example, the code of the network device 104 may be stamped on, printed on, or attached to a surface of the network device 104 and/or on the packaging of the network device 104. The code of the network device 104 may be any suitable code that can be read (e.g., optically read) by the installer device 106, which may be a handheld device, such as a mobile phone or a tablet. For example, the code of the network device 104 may be a QR code or a two-dimensional (2D) barcode on the network device (e.g., printed on a housing of the device itself or printed on packaging of the network device). The code on the network device 104 (e.g., the QR code) may represent or contain the serial number of the network device, a device type of the network device, and/or MAC address information of the network device. In another example, the code of the network device 104 is a radio-frequency identification (RFID) tag or a Near-Field-Communication (NFC) tag that can be wirelessly read by the installer device 106.

Figure 4A:
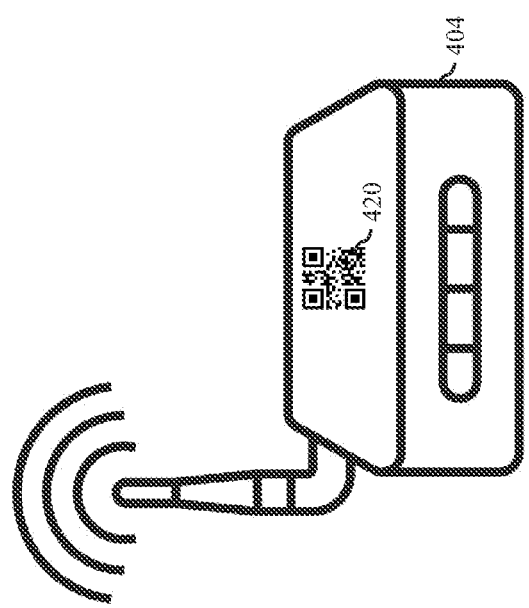
FIG. 4A depicts an embodiment of a wireless access point (AP) having a Quick Response (QR) code.

FIG. 4A depicts an embodiment of a wireless AP 404 having a QR code 420. The wireless AP 404 depicted in FIG. 4A is an embodiment of the network device 104 depicted in FIG. 1. However, the network device 104 depicted in FIG. 1 is not limited to the embodiment shown in FIG. 4A. In the embodiment depicted in FIG. 4A, the QR code 420 is on a surface of the wireless AP 404. For example, the QR code 420 is stamped on, printed on, or attached to a top surface, a bottom surface, and/or a side surface of the wireless AP 404. In some embodiments, the QR code 420 of the wireless AP 404 is on the packaging (e.g., the box or the wrapper) of the wireless AP 404. The installer or technician may use a mobile app installed in the installer device 106 to scan the QR code 420 on the wireless AP 404 to obtain the serial number of the wireless AP 404, a device type of the wireless AP 404, and/or MAC address information of the wireless AP 404. However, QR codes that can be used for the network device 104 are not limited to the embodiment depicted in FIG. 4A.

Figure 4B:
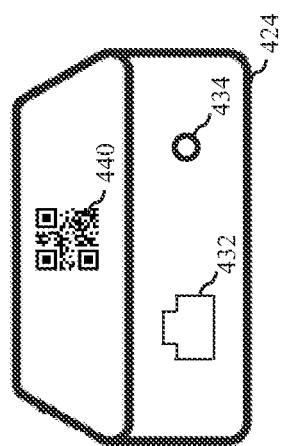
FIG. 4B depicts an embodiment of a wired network device having a QR code.

FIG. 4B depicts an embodiment of a wired network device 424 having a QR code 440. The wired network device 424 depicted in FIG. 4B is an embodiment of the network device 104 depicted in FIG. 1. However, the network device 104 depicted in FIG. 1 is not limited to the embodiment shown in FIG. 4B. In some embodiments, the wired communications device is a wired router (e.g., an Ethernet router), a wired switch (e.g., an Ethernet switch), a wired bridge device (e.g., an Ethernet bridge), or a wired hub. In the embodiment depicted in FIG. 4B, the QR code 440 is on a surface of the wired network device 424, which may include a communications port (e.g., an Ethernet port) 432 and a power connection port 434. For example, the QR code 440 is stamped on, printed on, or attached to a top surface, a bottom surface, and/or a side surface of the wired network device 424. In some embodiments, the QR code 440 of the wired network device 424 is on the packaging (e.g., the box or the wrapper) of the wired network device 424. The installer or technician may use a mobile app installed in the installer device 106 to scan the QR code 440 on the wired network device 424 to obtain the serial number of the wired network device 424, a device type of the wired network device 424, and/or MAC address information of the wired network device 424. However, QR codes that can be used for the network device 104 are not limited to the embodiment depicted in FIG. 4B.

Turning back to the swim-lane diagram shown in FIG. 2, in operation 212, the installer device 106 obtains information regarding the network device 104 based on a scan of the network device. For example, the installer device 106 obtains the serial number of the network device, a device type of the network device, and/or MAC address information of the network device based on a scanned QR code of the network device.

In operation 214, the installer device 106 transmits the information regarding the network device 104 that is obtained from a scan of the network device and/or location information of the network device 104 to the device deployment module 110 of the cloud server 102. Examples of location information of the network device 104 include without being limited to, address information in a map/navigation system, coordinate information in a map/navigation system, latitude and longitude information in a map/navigation system, and relative positional information in a map/navigation system. In some embodiments, the location information of the network device 104 includes one or more Global Positioning System (GPS) coordinates of the network device 104. In some embodiments, the installer device transmits the MAC address and the serial number of the network device and the customer information from a mobile app installed in the installer device that contains location information of the network device to the device deployment module.

In operation 216, the device deployment module 110 of the cloud server 102 associates the network device 104 with a database entry in the deployment database 112 of the cloud server without manual input. In some embodiments, the device deployment module 110 of the cloud server 102 associates the network information of the network device (e.g., the MAC address and the serial number of the network device) with name information of the network device that is stored in the deployment database 112. In some embodiments, the deployment database stores a list of network devices to be deployed at a customer site and detailed information related to the network devices, for example, device name information of the network devices, device type information of the network devices and deployment topology information that defines how network devices are connected to each other. After the network device 104 is associated with a corresponding database entry in the deployment database, the network device 104 is activated. In some embodiments, the device deployment module performs location based device association on the network device 104. The device deployment module may dynamically associate the location information (e.g., GPS coordinates) for the network device 104 with the network specific information of the network device 104. In some embodiments, the device deployment module associates the location information for the network device 104 with the name of the network device, the MAC address and the serial number of the network device 104 and the location based device association of the network device 104 is achieved.

Figure 5A:
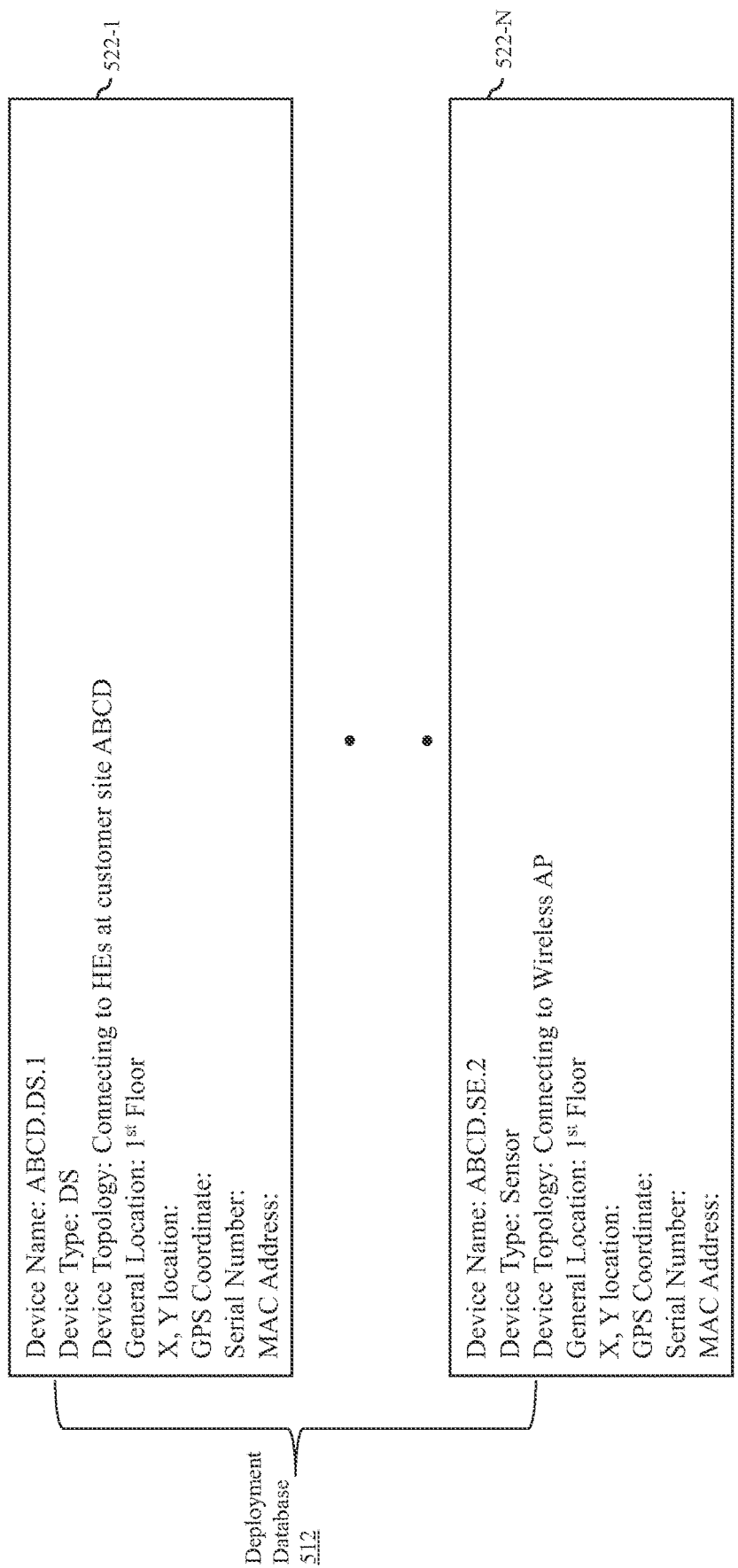
FIG. 5A depicts an embodiment of a deployment database with information regarding network devices to be deployed of a cloud server of the communications system depicted in FIG. 1.

FIG. 5A depicts an embodiment of the deployment database 112 with information regarding network devices to be deployed of the cloud server 102 of the communications system 100 depicted in FIG. 1. In the embodiment depicted in FIG. 5A, the deployment database 512 contains multiple database entries, 522-1, . . . , 522-N, where N is an integer greater than 1. Each of the database entries, 522-1, . . . , 522-N, includes device name information of a network device to be deployed at a customer site, device type information of the network device, deployment topology information of the network device, and optional general location information (e.g., floor information) of the network device. In some embodiments, each database entry also includes at least one detailed location tag or item, which is set to blank because a corresponding network device is not deployed to a customer site yet. For example, the database entry 522-1 includes device name information (ABCD.DS.1) of a network device to be deployed at a customer site with a ticker symbol of "ABCD," device type information (e.g., Distribution Switch (DS)) of the network device, deployment topology information (e.g., connecting to head ends (HEs) at the customer site ABCD) of the network device, general location information (first floor of the customer site), and blank X, Y location, GPS coordinate, serial number, and MAC address tags of the network device. The database entry 522-N includes device name information (ABCD.SE.2) of a network device to be deployed at a customer site with a ticker symbol of "ABCD," device type information (e.g., Sensor (SE)) of the network device, deployment topology information (e.g., connecting to a wireless AP at the customer site ABCD) of the network device, general location information (first floor of the customer site), and blank X, Y location, GPS coordinate, serial number, and MAC address tags. The deployment database 512 depicted in FIG. 5A is an embodiment of the deployment database 112 depicted in FIG. 1. However, the deployment database 112 depicted in FIG. 1 is not limited to the embodiment shown in FIG. 5A.

Figure 5B:
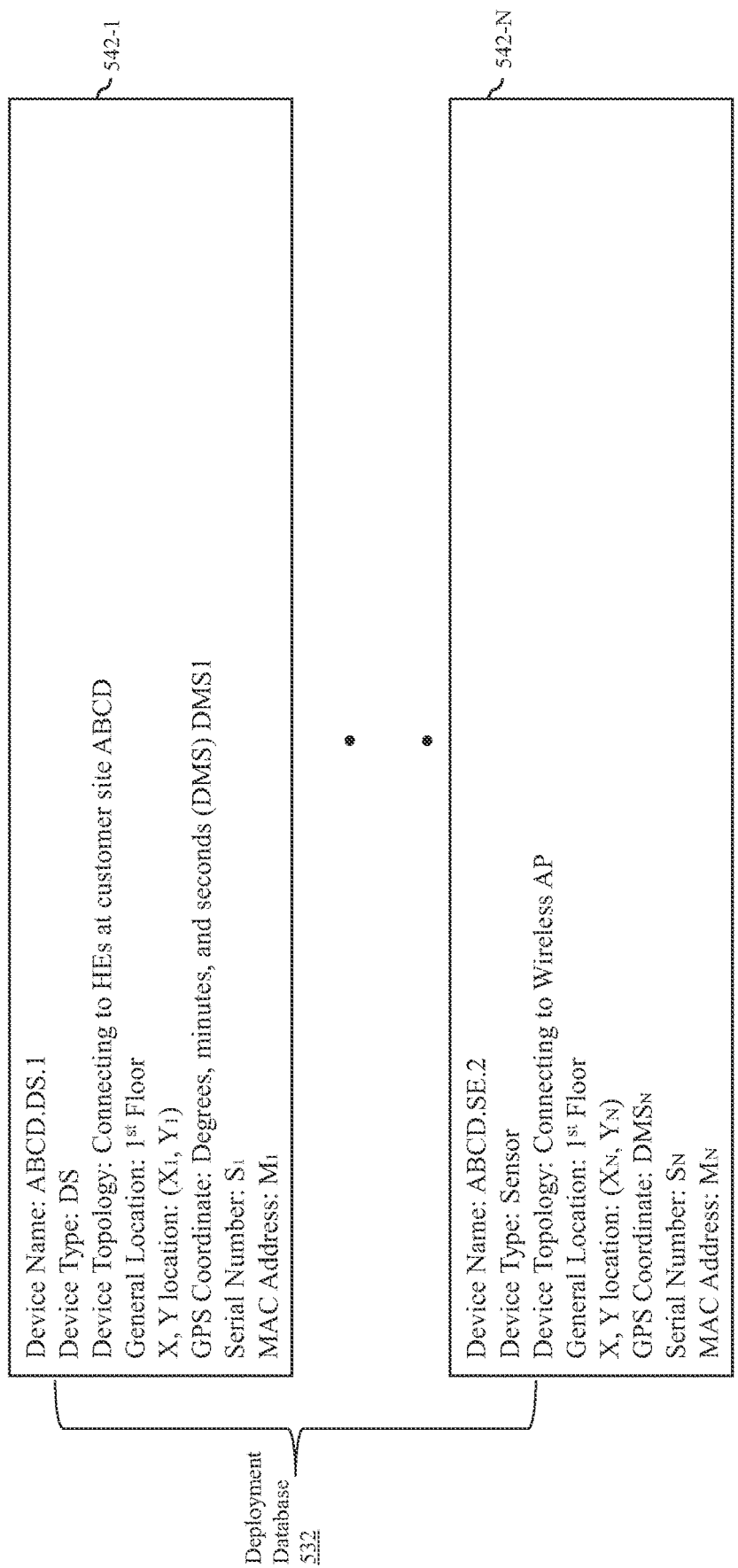
FIG. 5B depicts an embodiment of a deployment database with deployed device information of the cloud server of the communications system depicted in FIG. 1.

FIG. 5B depicts an embodiment of a deployment database 532 with deployed device information of the cloud server 102 of the communications system 100 depicted in FIG. 1. In the embodiment depicted in FIG. 5B, the deployment database 532 includes multiple database entries, 542-1, . . . , 542-N, where N is an integer greater than 1. Each of the database entries, 542-1, . . . , 542-N, includes device name information of a deployed network device at a customer site, device type information of the deployed network device, deployment topology information of the deployed network device, general location information (e.g., floor information) of the deployed network device, X, Y location information of the deployed network device, the GPS coordinate of the deployed network device, the serial number of the deployed network device, and the MAC address of the deployed network device. The deployment database 532 may be generated based from the deployment database 512, for example, by expanding the deployment database 512 to include the actual installed location information of a deployed network device and/or device specific information of a deployed network device. In some embodiments, based on scanning of network devices during installation, the device deployment module obtains device specific information (e.g., serial numbers and/or MAC addresses of the network devices) of network devices that are being installed and, subsequently, dynamically associate the naming information and/or the location information of the network devices that are being installed with the network specific information of the network devices that are being installed. For example, the database entry 542-1 includes device name information (ABCD.DS.1) of a deployed network device at the customer site with the ticker symbol of ABCD, device type information (e.g., Distribution Switch (DS)) of the deployed network device, deployment topology information (e.g., connecting to HEs at the customer site ABCD) of the deployed network device, general location information (first floor of the customer site) of the deployed network device, the X, Y location (e.g., $(X_1, Y_1)$) of the deployed network device, the GPS coordinate (e.g., degrees, minutes, and seconds (DMS) $DMS_1$) of the deployed network device, the serial number (e.g., $S_1$) of the deployed network device, and the MAC address (e.g., $M_1$) of the deployed network device. The database entry 542-N includes device name information (ABCD.SE.2) of a deployed network device at the customer site with the ticker symbol of ABCD, device type information (e.g., Sensor (SE)) of the deployed network device, deployment topology information (e.g., connecting to a wireless AP at the customer site ABCD) of the deployed network device, general location information (first floor of the customer site) of the deployed network device, the X, Y location (e.g., ($X_N$, $Y_N$)) of the deployed network device, the GPS coordinate (e.g., degrees, minutes, and seconds (DMS) $DMS_N$) of the deployed network device, the serial number (e.g., $S_N$) of the deployed network device, and the MAC address (e.g., $M_N$) of the deployed network device. The deployment database 532 depicted in FIG. 5B may be an embodiment of the deployment database 112 depicted in FIG. 1. However, the deployment database 112 depicted in FIG. 1 is not limited to the embodiment shown in FIG. 5B.

Figure 6:
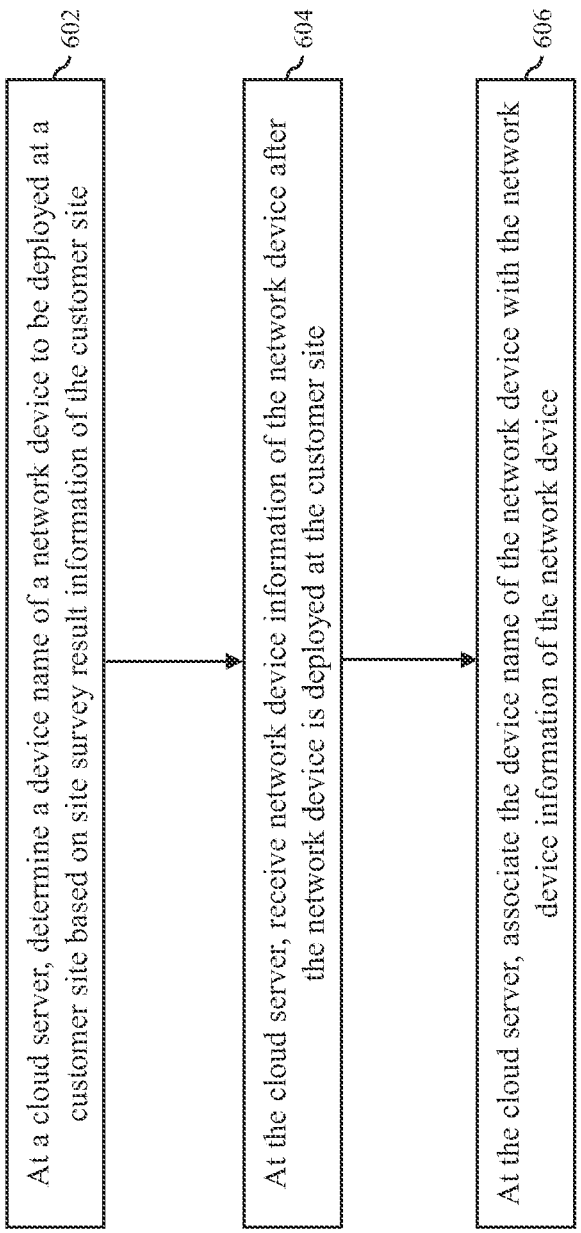
FIG. 6 is a process flow diagram of a method for network device name management in accordance to an embodiment of the invention.

FIG. 6 is a process flow diagram of a method for network device name management in accordance to an embodiment of the invention. According to the method, at block 602, at a cloud server, a device name of a network device to be deployed at a customer site is determined based on site survey result information of the customer site. In some embodiments, at the cloud server, the device name of the network device to be deployed at the customer site is determined based on a device naming rule set that utilizes a customer symbol of the customer site and a device type of the network device. The device name of the network device may include the customer symbol of the customer site, information related to the device type of the network device, and a respective number of the network device. In some embodiments, at the cloud server, the device name of the network device is stored in a deployment database. In some embodiments, the site survey result information includes at least one of locations and a number of wired ports to be installed at the customer site on a per floor basis, available power outlet and rack space information at the customer site on a per floor basis, locations and a number of wireless access points (APs) to be installed at the customer site on a per floor basis, and channel interference information between wireless APs. At block 604, at the cloud server, network device information of the network device is received after the network device is deployed at the customer site. In some embodiments, the network device information of the network device includes a device serial number and a media access control (MAC) address of the network device. In some embodiments, at the cloud server, an installation job for deploying the network device at the customer site is assigned to an installer and the network device information of the network device is receiving from the installer after the network device is deployed at the customer site. At block 606, at the cloud server, the device name of the network device is associated with the network device information of the network device. In some embodiments, at the cloud server, the device name of the network device is associated with a Domain Name System (DNS) entry of the network device. The operations 602, 604, 606 in the flow diagram of FIG. 6 may correspond to the operations 204, 214, 216 in the swim-lane diagram of FIG. 2. The cloud server may be similar to, the same as, or a component of the cloud server 102 depicted in FIG. 1. The network device may be similar to, the same as, or a component of the network device 104 depicted in FIG. 1. The customer site may be similar to, the same as, or a component of the customer site 114 depicted in FIG. 1.

Figure 7:
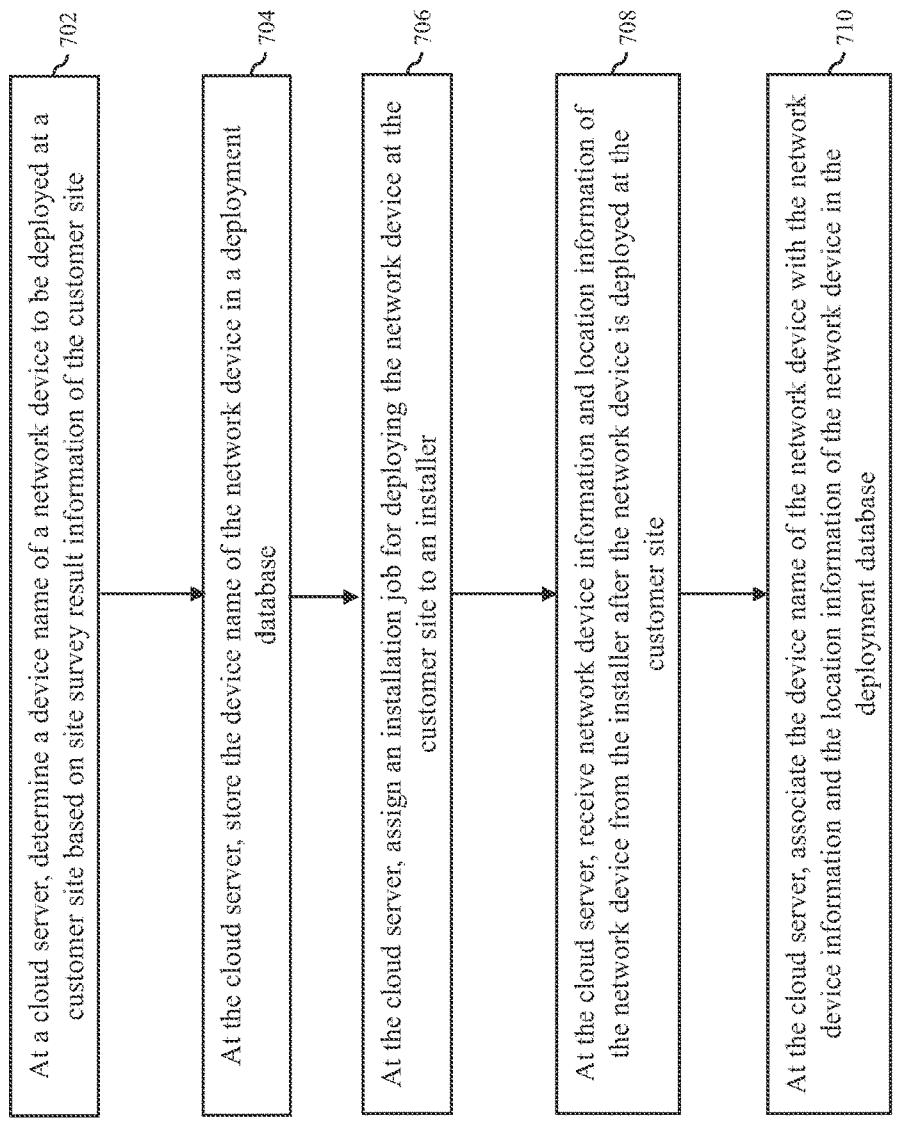
FIG. 7 is a process flow diagram of a method for network device name management in accordance to another embodiment of the invention.

FIG. 7 is a process flow diagram of a method for network device name management in accordance to another embodiment of the invention. According to the method, at block 702, at a cloud server, a device name of a network device to be deployed at a customer site is determined based on site survey result information of the customer site. In some embodiments, at the cloud server, the device name for the network device to be deployed at the customer site is determined based on a device naming rule set that utilizes a customer symbol of the customer site and a device type of the network device. The device name of the network device may include the customer symbol of the customer site, information related to the device type of the network device, and a respective number of the network device. At block 704, at the cloud server, the device name of the network device is stored in a deployment database. At block 706, at the cloud server, an installation job for deploying the network device at the customer site is assigned to an installer. At block 708, at the cloud server, network device information and location information of the network device is received from the installer after the network device is deployed at the customer site. In some embodiments, the network device information of the network device includes a device serial number and a MAC address of the network device. At block 710, at the cloud server, the device name of the network device is associated with the network device information of the network device in the deployment database. The operations 702, 704, 706, 708, 710 in the flow diagram of FIG. 7 may correspond to the operations 204, 206, 208, 214, 216 in the swim-lane diagram of FIG. 2. The cloud server may be similar to, the same as, or a component of the cloud server 102 depicted in FIG. 1. The network device may be similar to, the same as, or a component of the network device 104 depicted in FIG. 1. The deployment database may be similar to, the same as, or a component of the deployment database 112 depicted in FIG. 1. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network device name management, the method comprising:
    at a cloud server, determining a device name of a network device to be deployed at a customer site based on site survey result information of the customer site;
    at the cloud server, receiving network device information of the network device after the network device is deployed at the customer site;
    at the cloud server, associating the device name of the network device with the network device information of the network device; and
    at the cloud server, storing general physical location information that includes floor information, specific physical location information that includes two sets of coordinate information of different types, a serial number of the network device, device type information of the network device, a media access control (MAC) address of the network device, device topology information for the network device that indicates connectivity information of the network device, and the device name of the network device in an entry of a deployment database by expanding a corresponding entry of a device to be deployed database to include installed location information of the network device deployed at the customer site, which comprises the specific physical location information that includes the two sets of coordinate information of different types, and device specific information of the network device deployed at the customer site, which comprises the serial number of the network device and the MAC address of the network device.

2. The method of claim 1, wherein at the cloud server, determining the device name of the network device to be deployed at the customer site based on the site survey result information of the customer site comprises at the cloud server, determining the device name of the network device to be deployed at the customer site based on a device naming rule set that utilizes a customer symbol of the customer site and a device type of the network device.

3. The method of claim 1, wherein the coordinate information comprises Global Positioning System (GPS) degrees, minutes, and seconds (DMS) of the network device.

4. The method of claim 3, wherein the coordinate information further comprises a second type of coordinates of the network device.

5. The method of claim 1, further comprising at the cloud server, assigning an installation job for deploying the network device at the customer site to an installer, and wherein at the cloud server, receiving the network device information of the network device after the network device is deployed at the customer site comprises at the cloud server, receiving the network device information of the network device from the installer after the network device is deployed at the customer site.

6. The method of claim 1, wherein the network device information of the network device comprises the serial number of the network device and the MAC address of the network device.

7. The method of claim 1, further comprising at the cloud server, associating the device name of the network device with a Domain Name System (DNS) entry of the network device.

8. The method of claim 1, wherein the site survey result information comprises at least one of:
    locations and a number of wired ports to be installed at the customer site on a per floor basis;
    available power outlet and rack space information at the customer site on a per floor basis;
    locations and a number of wireless access points (APs) to be installed at the customer site on a per floor basis; and
    channel interference information between wireless APs.

9. A system for automatic network design, the system comprising:
    a device deployment module is configured to:
        determine a device name of a network device to be deployed at a customer site based on site survey result information of the customer site;
        receive network device information of the network device after the network device is deployed at the customer site;
        associate the device name of the network device with the network device information of the network device; and
        store general physical location information that includes floor information, specific physical location information that includes two sets of coordinate information of different types, a serial number of the network device, device type information of the network device, a media access control (MAC) address of the network device, device topology information for the network device that indicates connectivity information of the network device, and the device name of the network device in an entry of a deployment database by expanding a corresponding entry of a device to be deployed database to include installed location information of the network device deployed at the customer site, which comprises the specific physical location information that includes the two sets of coordinate information of different types, and device specific information of the network device deployed at the customer site, which comprises the serial number of the network device and the MAC address of the network device; and
    the deployment database connected to the device deployment module and configured to store the device name of the network device and the network device information.

10. The system of claim 9, wherein the device deployment module is further configured to determine the device name of the network device to be deployed at the customer site based on a device naming rule set that utilizes a customer symbol of the customer site and a device type of the network device.

11. The system of claim 10, wherein the device name of the network device comprises the customer symbol of the customer site, information related to the device type of the network device, and a respective number of the network device.

12. The system of claim 9, wherein the device deployment module is further configured to assign an installation job for deploying the network device at the customer site to an installer.

13. The system of claim 12, wherein the device deployment module is further configured to receive the network device information of the network device and location information of the network device from the installer after the network device is deployed at the customer site.

14. The system of claim 9, wherein the network device information of the network device comprises the serial number of the network device and the MAC address of the network device.

15. The system of claim 9, wherein the device deployment module is further configured to associate the device name of the network device with a Domain Name System (DNS) entry of the network device.

16. The system of claim 9, wherein the site survey result information comprises at least one of:
- locations and a number of wired ports to be installed at the customer site on a per floor basis;
- available power outlet and rack space information at the customer site on a per floor basis;
- locations and a number of wireless access points (APs) to be installed at the customer site on a per floor basis; and
- channel interference information between wireless APs.

17. A method for network device name management, the method comprising:
- at a cloud server, determining a device name of a network device to be deployed at a customer site based on site survey result information of the customer site;
- at the cloud server, storing general physical location information that includes floor information, specific physical location information that includes two sets of coordinate information of different types, a serial number of the network device, device type information of the network device, a media access control (MAC) address of the network device, device topology information for the network device that indicates connectivity information of the network device, and the device name of the network device in an entry of a deployment database by expanding a corresponding entry of a device to be deployed database to include installed location information of the network device deployed at the customer site, which comprises the specific physical location information that includes the two sets of coordinate information of different types, and device specific information of the network device deployed at the customer site, which comprises the serial number of the network device and the MAC address of the network device;
- at the cloud server, assigning an installation job for deploying the network device at the customer site to an installer;
- at the cloud server, receiving network device information and location information of the network device from the installer after the network device is deployed at the customer site; and
- at the cloud server, associating the device name of the network device with the network device information and the location information of the network device in the deployment database.

18. The method of claim 17, wherein at the cloud server, determining the device name of the network device to be deployed at the customer site based on the site survey result information of the customer site comprises at the cloud server, determining the device name for the network device to be deployed at the customer site based on a device naming rule set that utilizes a customer symbol of the customer site and a device type of the network device.

19. The method of claim 18, wherein the device name of the network device comprises the customer symbol of the customer site, information related to the device type of the network device, and a respective number of the network device.

20. The method of claim 17, wherein the network device information of the network device comprises the serial number of the network device and the MAC address of the network device.

* * * * *